(12) United States Patent
Takayanagi et al.

(10) Patent No.: US 9,086,269 B2
(45) Date of Patent: Jul. 21, 2015

(54) STEERING ANGLE SENSOR AND ELECTRIC POWER STEERING DEVICE EMPLOYING THE SAME

(71) Applicant: HITACHI AUTOMOTIVE SYSTEMS STEERING, LTD., Hiki-gun, Saitama (JP)

(72) Inventors: Naoki Takayanagi, Kawasaki (JP); Tatsuyoshi Maruyama, Atsugi (JP); Kiyotaka Shirakubo, Ayase (JP)

(73) Assignee: HITACHI AUTOMOTIVE SYSTEMS STEERING, LTD., Hiki-gun (JP)

( * ) Notice: Subject to any disclaimer, the term of this patent is extended or adjusted under 35 U.S.C. 154(b) by 0 days.

(21) Appl. No.: 14/132,392

(22) Filed: Dec. 18, 2013

(65) Prior Publication Data

US 2014/0246267 A1     Sep. 4, 2014

(30) Foreign Application Priority Data

Mar. 1, 2013 (JP) ................................. 2013-040326

(51) Int. Cl.
| | |
|---|---|
| *B62D 5/04* | (2006.01) |
| *G01B 7/30* | (2006.01) |
| *B62D 15/02* | (2006.01) |
| *G01P 3/487* | (2006.01) |
| *G01D 5/14* | (2006.01) |
| *G01B 21/04* | (2006.01) |

(52) U.S. Cl.
CPC ............... *G01B 7/30* (2013.01); *B62D 5/0457* (2013.01); *B62D 15/0215* (2013.01); *G01B 21/047* (2013.01); *G01D 5/145* (2013.01); *G01P 3/487* (2013.01)

(58) Field of Classification Search
CPC .......... B62D 5/04; B62D 5/0421; G01B 7/30; G01D 5/145; G01P 3/487
USPC ................. 73/1.75, 865.9; 180/443, 444, 446; 324/173, 174, 207.12, 207.13, 207.21, 324/207.25; 362/40, 43; 701/41, 42
See application file for complete search history.

(56) References Cited

U.S. PATENT DOCUMENTS

| | | | |
|---|---|---|---|
| 6,324,905 B2 | 12/2001 | Noltemeyer et al. | |
| 7,201,069 B2* | 4/2007 | Sakabe | 73/862.31 |
| 7,424,858 B2* | 9/2008 | Matsuda et al. | 114/144 E |
| 8,047,066 B2* | 11/2011 | Kang et al. | 73/117.02 |
| 8,290,664 B2* | 10/2012 | Collet et al. | 701/42 |
| 8,810,239 B2* | 8/2014 | Shin | 324/207.22 |
| 2001/0013774 A1 | 8/2001 | Noltemeyer et al. | |
| 2004/0118220 A1* | 6/2004 | Takuma | 73/862.333 |

(Continued)

FOREIGN PATENT DOCUMENTS

JP     2001-505667 A     4/2001

*Primary Examiner* — Joseph Rocca
*Assistant Examiner* — Marc A Scharich
(74) *Attorney, Agent, or Firm* — Foley & Lardner LLP

(57) ABSTRACT

A steering angle sensor 17 is provided which can minimize a detection error even when a steering shaft 6 is inclined. In an annular clearance t1 defined between the steering shaft 6 and an inner cylindrical wall of a first gear 24, there is compressed an elastic O-ring 23. Due to provision of the elastic O-ring 23, inclination of the steering shaft 6, which tends to occur during handling of a steering wheel 1, is suitably absorbed by the elastic O-ring 23, and thus, generation of detection error caused by inclination of the first gear 24, which would follow the inclination of the steering shaft 6, is suppressed or at least minimized.

20 Claims, 5 Drawing Sheets

(56) References Cited

U.S. PATENT DOCUMENTS

| | | |
|---|---|---|
| 2005/0022613 A1* | 2/2005 | Sakabe .................... 73/862.31 |
| 2007/0090830 A1* | 4/2007 | Shiraga et al. ........... 324/207.25 |
| 2008/0127755 A1* | 6/2008 | Kim ............................ 73/865.9 |
| 2009/0013821 A1* | 1/2009 | Koma et al. .................... 74/575 |
| 2009/0289623 A1* | 11/2009 | Sano ....................... 324/207.25 |
| 2010/0235054 A1* | 9/2010 | Hoskins et al. ................. 701/42 |
| 2013/0093415 A1* | 4/2013 | Moldenhauer ........... 324/207.25 |
| 2013/0147469 A1* | 6/2013 | Noda et al. .............. 324/207.25 |

* cited by examiner

DIFFERENCE BETWEEN ACTUAL STEERING ANGLE AND DETECTED STEERING ANGLE

STEERING ANGLE SENSOR AND ELECTRIC POWER STEERING DEVICE EMPLOYING THE SAME

BACKGROUND OF THE INVENTION

1. Field of the Invention

The present invention relates in general to steering angle sensors for detecting the steering angle of a steering wheel of wheeled motor vehicles, and more particularly to the steering angle sensors of a type that is employed in an electric power steering device for detecting the steering angle of the steering wheel.

2. Description of Related Art

Hitherto, various types of steering angle sensors have been proposed and put into practical use particularly in the field of is wheeled motor vehicles. One of them is disclosed in Japanese Translation of PCT International Application 2001-505667, which generally comprises a first gear that is fixed to a steering shaft to rotate together therewith, a second gear that is meshed with the first gear and has a magnet and a third gear that is meshed with the first gear and has a magnet, in which the number of teeth of the second gear is different from that of the third gear and the magnets of the second and third gears constitute respective MR sensors. That is, based on voltage variation of the MR sensors, a steering angle (viz., absolute steering angle) defined between a neutral angular position of the steering wheel and a current angular position of the steering wheel is detected.

However, due to its inherent construction of the steering angle sensor of the above-mentioned Published Application, the detected steering angle tends to have a detection error. That is, in the known steering angle sensor, the first gear is directly connected to the sheering shaft to rotate together therewith. Thus, when, during handling of the steering wheel by a driver, the steering shaft is inclined, the first gear is inevitably inclined following the inclination of the steering shaft. However, due to inclination of the first gear thus made, transmission manner of rotation of the first gear to the second and third gears is considerably affected or deteriorated, which causes generation of the above-mentioned detection error.

Accordingly, it is an object of the present invention to provide a steering angle sensor which is free of the above-mentioned drawback.

That is, according to the present invention, there is provided a steering angle sensor which suppresses generation of the above-mentioned detection error even when the steering shaft is inclined.

In accordance with a first aspect of the present invention, there is provided a steering angle sensor which comprises a steering shaft (6) rotating together with a steering wheel (1); a sensor housing (16) arranged to enclose the steering shaft (6); a first gear (24) rotatably received in the sensor housing (16), the first gear (24) including an annular body portion (24A) disposed about a given part of the steering shaft (6) leaving a given annular clearance (t1) therebetween and an annular toothed portion (24B) formed on an outer periphery of the annular body portion (24A); a second gear (25) rotatably received in the sensor housing (16), the second gear (25) having a magnetic member (29) at a center portion thereof and an annular toothed portion meshed with the annular toothed portion (24B) of the first gear (24); a third gear (26) rotatably received in the sensor housing (16), the third gear (26) having another magnetic member (30) at a center portion thereof and an annular toothed portion meshed with the annular toothed portion of the second gear (25), the numbers of respective teeth of the second and third gears (25, 26) being mutually indivisible to provide a unit of the second and third gears (25, 26) with a given speed reduction ratio; a first MR element (31A) detecting a change of a magnetic field produced by the magnetic member of the second gear (25) for obtaining a first rotation angle of the second gear (25); a second MR element (31B) detecting a change of a magnetic field produced by the magnetic member of the third gear (26) for obtaining a second rotation angle of the third gear (26); an elastic member (23) compressed in the given annular clearance (t1) between the steering shaft (6) and the first gear (24), a thickness of the elastic member (23) in a non-compressed condition being larger than a thickness of the given annular clearance (t1); and a control unit (18) that obtains an absolute steering angle of the steering wheel (1) based on the first and second rotation angles of the second and third gears (25, 26).

In accordance with a second aspect of the present invention, there is provided an electric power steering device which comprises a steering mechanism including a steering shaft (6) that rotates together with a steering wheel (1) and a rack bar (8) that steers steered road wheels of an associated vehicle in response to rotation of the steering shaft (6); an electric motor (19) by which a steering assist force is fed to the steering mechanism; a steering angle sensor that detects an absolute steering angle, the absolute steering angle being a rotation amount of the steering wheel (1) from a neutral angular position of the steering wheel (1) where the steered road wheels face in a straight advancing direction to a current angular position of the steering wheel (1); and a control unit (18) that controls the electric motor (19) based on an output signal from the steering angle sensor, wherein the steering angle sensor comprises a sensor housing (16) arranged to enclose the steering shaft (6); a first gear (24) rotatably received in the sensor housing (16), the first gear (24) including an annular body portion (24A) disposed about a given part of the steering shaft (6) leaving a given annular clearance (t1) therebetween and an annular toothed portion (24B) formed on an outer periphery of the annular body portion (24A); a second gear (25) rotatably received in the sensor housing (16), the second gear (25) having a magnetic member (29) at a center portion thereof and an annular toothed portion meshed with the annular toothed portion (24B) of the first gear (24); a third gear (26) rotatably received in the sensor housing (16), the third gear (26) having another magnetic member (30) at a center portion thereof and an annular toothed portion meshed with the annular toothed portion of the second gear (25), the numbers of respective teeth of the second and third gears (25, 26) being mutually indivisible to provide a unit of the second and third gears (25, 26) with a given speed reduction ratio; a first MR element (31A) detecting a change of a magnetic field produced by the magnetic member of the second gear (25) for obtaining a first rotation angle of the second gear (25); a second MR element (31B) detecting a change of a magnetic field produced by the magnetic member of the third gear (26) for obtaining a second rotation angle of the third gear (26); and an is elastic member (23) compressed in the given annular clearance (t1) between the steering shaft (6) and the first gear (24), a thickness of the elastic member (23) in a non-compressed condition being larger than a thickness of the given annular clearance (t1); and a control unit (18) that obtains an absolute steering angle of the steering wheel (1) based on the first and second rotation angles of the second and third gears (25, 26).

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a steering angle sensor of the present invention and an electric power steering device practically employing the steering angle sensor will be described in detail with reference to the accompanying drawings.

First, for ease of understanding, the electric power steering device that employs therein the steering angle sensor will be described with the aid of FIG. 1.

Figure 1:
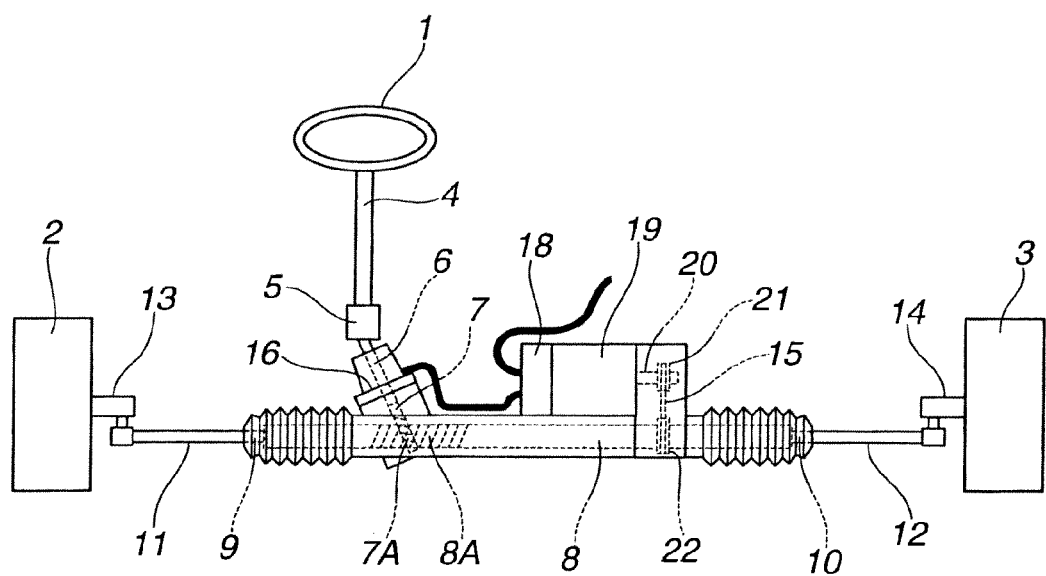
FIG. 1 is a schematic view of an electric power steering device that practically employs therein a steering angle sensor of the present invention.

As is seen from FIG. 1, the electric power steering device is actuated by a steering wheel 1 arranged in a driver's cabin of an associated motor vehicle. That is, the steering wheel 1 is mechanically connected to steered front road wheels 2 and 3 of the vehicle through the electric power steering device (more specifically, a steering power mechanism of the power steering device).

The steering power mechanism comprises a steering shaft 6 that is connected to the steering wheel 1 through a universal joint 5 and an intermediate shaft 4 so that the steering shaft 6 rotates together with the steering wheel 1, a pinion shaft 7 that is connected to the steering shaft 6 through a torsion bar (not shown) so that a torque of the steering shaft 6 can be transmitted to the pinion shaft 7 and a rack bar 8 that has on an outer cylindrical surface thereof a rack 8A meshed with a pinion 7A provided by the pinion shaft 7. That is, a so-called rack and pinion mechanism is constituted by the rack bar 8 and the pinion 7A.

Both ends of the rack bar 8 are connected to the steered front road wheels 2 and 3 through ball joints 9 and 10, tie rods 11 and 12 and knuckle arms 13 and 14 respectively.

When, with this construction of steering power mechanism, the steering wheel 1 is handled by an operator (viz., driver), the intermediate and steering shafts 4 and 6 are rotated about their respective axes rotating the pinion shaft 7 in the same direction while twisting the torsion bar disposed between the steering shaft 6 and the pinion shaft 7. That is, due to provision of the torsion bar, turning of the pinion shaft 7 is somewhat delayed or damped relative to the turning of the steering shaft 6. Upon this, the turning of the pinion shaft 7 is converted to an axial movement of the rack bar 8 through the above-mentioned rack and pinion mechanism, so that the knuckle arms 13 and 14 are pulled in a direction of the vehicle width through the ball joints 9 and 10 and the tie rods 11 and 12 resulting in that the steered front road wheels 2 and 3 are steered in a desired direction.

Within a housing 16 that encloses the steering shaft 6 and pinion shaft 7, there are installed various sensors (not shown in FIG. 1) that detect various information on steering, which are an after-mentioned steering angle sensor 17 that detects a steering angle of the steering shaft 6 and a torque sensor (not shown) that detects a steering torque inputted to the steering shaft 6 by practically using a difference in relative rotation angle between the steering shaft 6 and the pinion shaft 7 caused by the twisting of the torsion bar.

A control unit (ECU) 18 is employed which is integrally connected to an electric motor 19 by which a steering assist force is fed to the steering mechanism. The control unit 18 is for example a microcomputer and functions to control the electric motor 19 based on the various information such as the above-mentioned steering angle of the steering shaft 6, the steering torque inputted to the steering shaft 6, a vehicle speed, etc.

As is seen from FIG. 1, an output shaft 20 of the electric motor 19 is provided with a pulley 21 that is operatively connected through an endless belt 15 to another pulley 22 that is connected to an outer cylindrical part of the rack bar 8. Although not shown in the drawing, a speed reduction mechanism (viz., ball-screw mechanism) is arranged between the pulley 22 and the rack bar 8 so that rotation of the electric motor 19 transmitted through the endless belt 15 is converted to the axial movement of the rack bar 8 while being reduced in speed.

Figure 2:
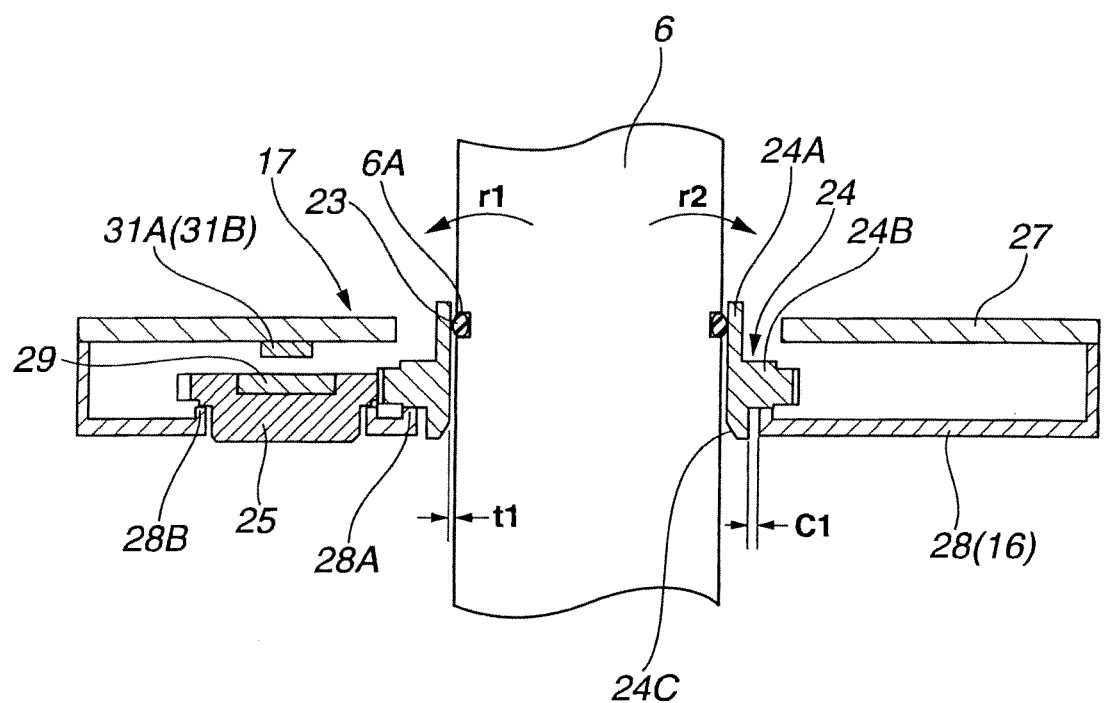
FIG. 2 is a vertically sectioned enlarged view of the steering angle sensor installed in a housing of the electric power steering device of FIG. 1.
Figure 3:
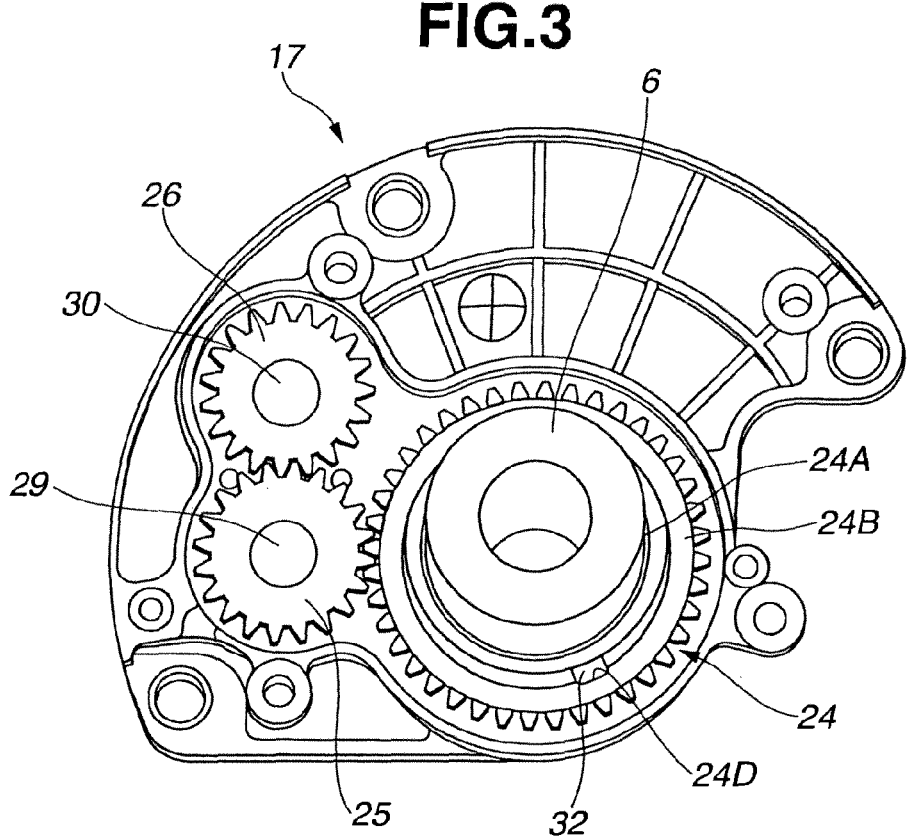
FIG. 3 is an enlarged perspective view of an essential part of the steering angle sensor with a circuit substrate removed.
Figure 4:
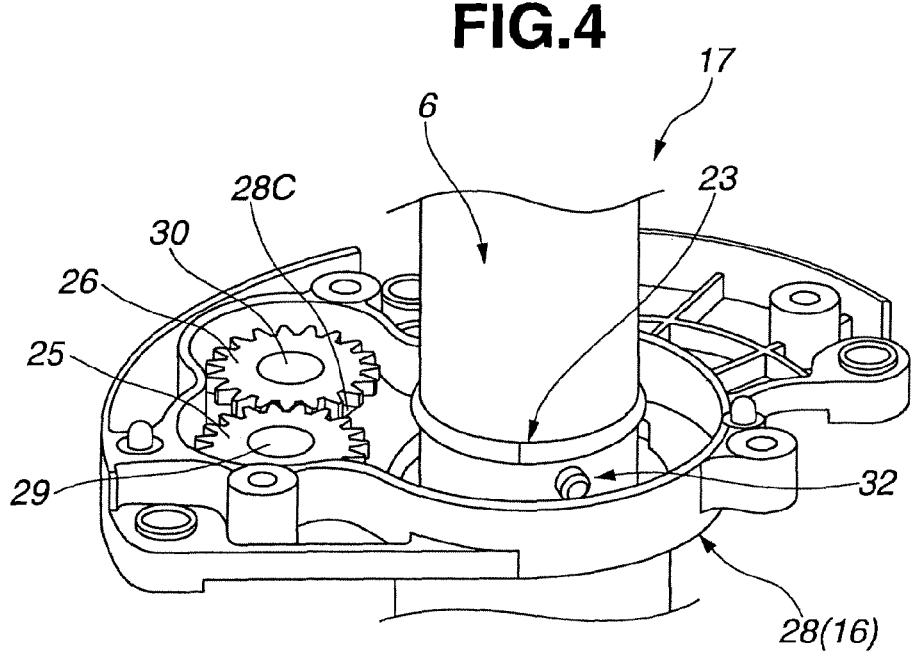
FIG. 4 is an enlarged perspective view of the essential part of the steering angle sensor with a first gear removed.

As is seen from FIGS. 2 to 4, the steering angle sensor 17 comprises a first gear 24 that is disposed through an after-mentioned elastic O-ring (23) on the steering shaft 6 to be rotatable therewith, a second gear 25 that is meshed with the first gear 24 and a third gear 26 that is meshed with the second gear 25. As is seen from FIG. 2, upper sides of the first, second and third gears 24, 25 and 26 are covered by a circuit substrate 27 keeping a certain space therebetween. The circuit substrate 27 is electrically connected to the control unit 18. These three gears 24, 25 and 26 are spur gears.

For housing these three gears 24, 25 and 26 and the circuit substrate 27, there is provided a gear case that includes a lower case 28 and an upper case (not shown) which are coupled and tightly mounted to the sensor housing 16 through a plurality of connecting bolts. That is, the gear case serves as a part of the sensor housing 16.

The lower case 28 is formed with a first gear supporting annular portion 28A that positions and rotatably supports the first gear 24, a second gear supporting annular portion 28B that positions and rotatably supports the second gear 25 and a third gear supporting annular portion 28C that positions and rotatably supports the third gear 26. These three gear supporting annular portions 28A, 28B and 28C are projected upward and have the same height in axial direction.

Top surfaces of the first, second and third gear supporting annular portions 28A, 28B and 28C are made flat and extend perpendicular or orthogonal to a rotation axis of the steering shaft 6, so that the first to third gears 24 to 26 are smoothly rotatably put on the top surfaces of the gear supporting annular portions 28A, 28B and 28C keeping a parallel posture relative to the steering shaft 6.

As is seen from FIG. 2, between the first gear 24 (specifically, an after-mentioned annular body portion 24A of the first gear 24) and the first gear supporting annular portion 28A, there is defined an annular clearance C1 in order to avoid or at least minimize interference of the lower case 28 against rotation of the first gear 24, the annular clearance C1 being an annular clearance provided when the steering shaft 6 takes a neutral angular position without being inclined relative to the first gear 24. It is to be noted that a thickness of the annular clearance C1 is set smaller than an amount of backlash that takes place between the first and second gears 24 and 25.

The first to third gears 24 to 26 are made of resin for reducing the weight and gear meshing noise and as is seen from FIG. 3, each gear 24, 25 or 26 is integrally formed with a plurality of teeth on an outer peripheral potion.

As will be described in detail hereinafter, the second and third gears 25 and 26 are used for detecting a steering angle. For this purse, the numbers of respective teeth of the second and third gears 25 and 26 are mutually indivisible to provide a unit of these gears 25 and 26 with a given speed reduction ratio.

As is seen from FIG. 3, the second and third gears 25 and 26 are provided at centers thereof with respective magnetic members 29 and 30 each having N and S poles at diametrically opposed ends thereof.

As is seen from FIG. 2, a first MR element 31A and a second MR element 31B, which are magnetoresistive elements, are fixed to a lower surface of the circuit substrate 27 at positions facing the magnetic members 29 and 30 mounted on the second and third gears 25 and 26. Each MR element 31A or 31B detects a change of a magnetic field generated by the corresponding magnetic member 29 or 30 as a change of resistance value of the resistive element, so that rotation angles (viz., first and second rotation angles) of the corresponding second and third gears 25 and 26 are detected.

Based on the first and second rotation angles thus detected, the steering angle (viz., absolute steering angle) of the steering wheel 1 is calculated. This calculation processing is carried out in the control unit 18 using the microcomputer.

More specifically, for obtaining the absolute steering angle, a rotation amount of the steering wheel 1 from a neutral angular position of the steering wheel 1 where the steered front road wheels 2 and 3 face in a straight advancing direction to a current angular position of the steering wheel 1 is detected based on the first and second angular positions.

That is, even when each of the first and second rotation angles of the second and third gears 25 and 26 is reset to 0 (zero) each time the gear 25 or 26 turns once, combinations of the first and second rotation angles that bring about a certain steering angle are limited to one with respect to a rotation angle of the steering shaft 6 that corresponds to the steering angle, and thus, the steering angle of the steering wheel 1 can be detected from the combinations of the first and second rotation angles. The steering angle (viz., absolute steering angle) thus detected is fed to the control unit 18 for causing the electric motor 19 to make the steering assist work.

In the following, a connecting mechanism between the steering shaft 6 and the first gear 24, which may be essential in the present invention, will be described in detail with reference to the drawings.

As is seen from FIG. 2, the first gear 24 comprises an annular body portion 24A that is shaped to surround the steering shaft 6 and an annular toothed portion 24B that is integral with the annular body portion 24A and shaped to project radially outward from the annular body portion 24A. As is seen from FIG. 3, the annular toothed portion 24B is integrally formed with a plurality of teeth at an outer peripheral portion thereof.

As is seen from FIG. 2, a cylindrical inner surface of the annular body portion 24A is spaced from an outer cylindrical surface of the steering shaft 6 by a given distance t1. Between the respective cylindrical surfaces of the annular body portion 24A and the steering shaft 6, there is compressed an elastic O-ring 23. That is, the first gear 24 is mounted to the steering shaft 6 through the elastic O-ring 23.

The arrangement of the elastic O-ring 23 to the first gear 24 and the steering shaft 6 will be much clarified from the following description.

Figure 5:
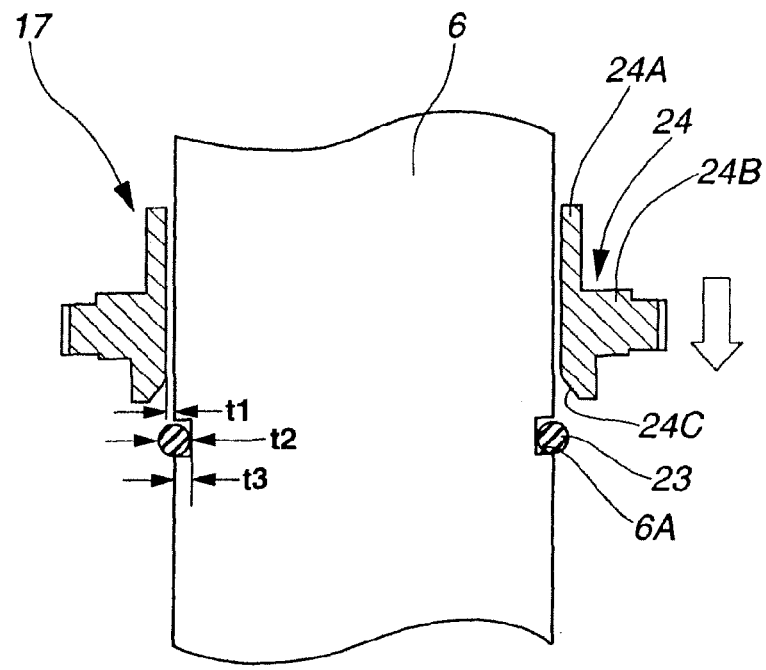
FIG. 5 is a view similar to FIG. 2, but showing a condition in which the first gear is about to be mounted to a correct position of a steering shaft.

As will be seen from FIGS. 2 and 5, the steering shaft 6 is formed at the outer cylindrical surface thereof with an annular groove 6A of a generally rectangular cross section. In the annular groove 6A, there is compressed the elastic O-ring 23. In a non-compressed condition, the circularly extending elongate part of the elastic O-ring 234 has a generally circular cross section. The O-ring 23 is made of synthetic rubber, synthetic resin or the like. Due to its elasticity, the O-ring 23 is stably and intimately held in the annular groove 6A.

As will be understood from FIG. 5, before being compressed by the first gear 24, a diameter t2 of the circularly extending elongate part of the O-ring 23 in the annular groove 6A is greater than a sum of the above-mentioned distance t1 (viz., the distance between the cylindrical inner surface of the annular body portion 24A and the outer cylindrical surface of the steering shaft 6) and a depth t3 of the annular groove 6A. That is, following inequality is established.

$$t2 > t1 + t3 \quad (1)$$

With this, the elastic O-ring 23 is sufficiently compressed in the annular groove 6A having diametrically opposed portions of the circularly extending elongate part of the O-ring 23 respectively pressed against the steering shaft 6 (more specifically, the bottom of the annular groove 6A of the steering shaft 6) and the annular body portion 24A (more specifically, the inner cylindrical surface of the annular body portion 24A) of the first gear 24.

With the above-mentioned arrangement of the elastic O-ring 23 relative to the steering shaft 6 and the annular body portion 24A of the first gear 24, rotation of the steering shaft 6 produces a certain friction resistance between the annular body portion 24A and the steering shaft 6 and thus with the frictional resistance, the rotation of the steering shaft 6 can be transmitted to the annular body portion 24A of the first gear 24. In other words, the frictional connection between the steering shaft 6 and the first gear 24 is so made as to produce a friction resistance that is greater than that produced between the first gear 24 and the second gear 25.

As will be understood from FIG. 1, the elastic O-ring 23 is set at a position near a bearing (not shown) by which the steering shaft 6 is supported in the housing 16.

As is seen from FIG. 2, the annular body portion 24A of the first gear 24 is formed at a lower end thereof with a tapered annular inner surface 24C of which diameter becomes greater as approaching the lower end of the annular body portion 24A.

As will be seen from FIG. 5 that shows, with a thick arrow, a moving direction of the first gear 24 at the time when the first gear 24 is about to be assembled to the steering shaft 6, due to provision of the tapered annular inner surface 24C, mounting the first gear 24 to a correct position (viz., the position where the elastic O-ring 23 is located) of the steering shaft 6 is easily and smoothly carried out. That is, in response to the downward movement (in FIG. 5) of the first gear 24, the O-ring 23 is gradually compressed by the tapered annular inner surface 24C, which suppresses coming off of the O-ring 23 from the annular groove 6A of the steering shaft 6 and unstable twisting of the O-ring 23 in the annular groove 6A.

In addition to the above-mentioned frictional connection between the steering shaft 6 and the first gear 24, there is further provided a physical connection therebetween in the present invention.

As is seen from FIGS. 3 and 4, for realizing the physical connection, the steering shaft 6 is provided with an engaging pin 32 as a first engaging portion and the first gear 24 is formed with a recess 24D as a second engaging portion.

As is seen from FIGS. 3 and 4, the engaging pin 32 is cylindrical in shape and has an inner end press-fitted into a bore formed in the steering shaft 6 and an outer end projected radially outward. The engaging pin 32 thus rotates together with the steering shaft 6.

The recess 24D is formed in the cylindrical inner surface of the annular body portion 24A of the first gear 24. When viewed in FIG. 2, the recess 24D (not shown) is provided at an axially middle part of the cylindrical inner surface of the annular body portion 24A.

As will be seen from FIG. 3, a peripheral size of the recess 24D is slightly larger than a diameter of the cylindrical engaging pin 32.

It is to be noted that an effective engagement of the engaging pin 32 with the recess 24D (more specifically, one peripheral wall of the recess 24D) is kept established so long as the elastic O-ring 23 is properly compressed between the steering shaft 6 and the first gear 24.

Accordingly, even if, due to slippage of the elastic O-ring 23 relative to the steering shaft 6 upon rotation of the steering shaft 6, the steering shaft 6 is subjected to an idle rotation but slightly relative to the first gear 24, the engaging pin 32 of the steering shaft 6 instantly becomes into abutment with one of lateral walls of the recess 24D of the first gear 24 thereby to transmit the rotation of the steering shaft 6 to the first gear 24 resulting in an integral rotation of first gear 24 with the steering shaft 6.

As is described hereinabove, between the steering shaft 6 and the first gear 24, there are provided two types of connecting means, one being a frictional connection means and the other being a physical connection means. The frictional connection is mainly effected by the elastic O-ring 23, and the physical connection is mainly effected by the engaging pin 32 and the engaging recess 24D.

As is described hereinabove, in the steering angle sensor 17 of the present invention, there is compressed the elastic O-ring 23 between the outer cylindrical surface of the steering shaft 6 and the inner cylindrical surface of the first gear 24. Thus, if, as is seen from FIG. 2, the steering shaft 6 is subjected to an inclination in the direction of r1 or r2 upon handling of the steering wheel 1 by a driver, the angular displacement of the steering shaft 6 can be absorbed by a compressive deformation of the O-ring 23. That is, transmission of inclination of the steering shaft 6 to the first gear 24 is suppressed.

In the known steering angle sensor disclosed in the above-mentioned Japanese Translation of PCT International Application 2001-505667, the first gear is directly connected to the steering shaft. In this known type, inclination of the steering shaft directly brings about inclination of the first gear, which is undesirable as is mentioned hereinabove.

While, in the present invention, even if the steering shaft 6 is inclined, the first gear 24 can keep its stable posture due to provision of the elastic O-ring 23, and thus, rotation transmission to from the first gear 24 to the third gear 26 through the second gear 25 is stably and precisely carried out. Accordingly, undesired detection error that tends to be seen in the above-mentioned known steering angle sensor is suppressed in the present invention. Thus, the steering angle sensor 17 of the present invention has an enhanced detection accuracy as compared with the above-mentioned known type.

Furthermore, in the present invention, the elastic O-ring 23 has a generally circularly cross section at the circularly extending elongate part thereof and is compressed in the annular groove 6A of the steering shaft 6 having its outer rounded portion entirely pressed against the cylindrical inner surface of the first gear 24. Thus, if the steering shaft 6 is subjected to an inclination, a certain biasing force is applied to the O-ring 23 from the inner cylindrical surface of the first gear 24 resulting in a compression deformation of the elastic O-ring 23, so that the above-mentioned displacement absorbing effect of the O-ring 23 against the inclination of the steering shaft 6 is improved. As a result, the first gear 24 can be stably postured at a proper position.

Furthermore, in the present invention, the elastic O-ring 23 is arranged in the vicinity of the above-mentioned bearing (not shown) by which the steering shaft 6 is supported in the housing 16. This means that even when the steering shaft 6 is inclined, a radial relative displacement between the steering shaft 6 and the annular body portion 24A of the first gear 24 is small, and thus, the elastic O-ring 23 can exhibit the displacement absorbing effect within its compression deformation allowable limit.

Furthermore, in the invention, the elastic O-ring 23 is compressed between the inner cylindrical surface of the annular body portion 24A of the first gear 24 and the outer cylindrical surface of the steering shaft 6, and thus, the O-ring 23 elastically contacts both the annular body portion 24A and the steering shaft 6, which causes assured production of a frictional resistance therebetween bringing about the transmission of rotation from the steering shaft 6 to the first gear 24. Thus, when a rotation direction of the steering shaft 6 changes, that is, for example, when the steering wheel 1 is turned back in the process of turning forward, a deviation in a rotational phase of the first gear 24 relative to the steering shaft 6 is suppressed. If such turning back action of the steering wheel 1 is made in the above-mentioned known arrangement in which the steering shaft 6 and the first gear 24 are connected through only a key-connection, the deviation in a rotational phase of the first gear 24 relative to the steering shaft 6 takes place due to an inevitable backlash that takes place between a key and a key-groove, which of course lowers the detection accuracy of the steering angle sensor. While, in the present invention, due to provision of the elastic O-ring 23 arranged in the above-mentioned manner, such drawback can be avoided.

Furthermore, since, in the invention, the O-ring 23 is made of synthetic rubber, synthetic resin or the like, a needed elastical characteristic of the O-ring 23 is obtained with ease. That is, if such O-ring is made of metal, very complicated and highly expensive processing is needed for shaping the O-ring to exhibit a spring-like property. While, in the invention, the elastic O-ring 23 is easily and economically obtained, which brings about improvement of production efficiency of the steering angle sensor.

Furthermore, in the invention, the O-ring 23 is set in the annular groove 6A formed around the outer cylindrical surface of the steering shaft 6. Thus, positioning of the O-ring 23 to the steering shaft 6 is facilitated and positional displacement of the O-ring 23 is easily corrected, and thus, the work for mounting or assembling the O-ring 23 on the steering shaft 6 can be simplified.

Furthermore, in the invention, the annular groove 6A is provided by the steering shaft 6, not by the annular body portion 24A of the first gear 24. As is easily known, forming the annular groove 6A on the outer cylindrical surface of the steering shaft 6 is quite easy as compared with the forming on the inner cylindrical surface of the annular body portion 24A of the first gear 24.

Furthermore, in the invention, the thickness of the annular clearance C1 (see FIG. 2) defined between the annular body portion 24A of the first gear 24 and the first gear supporting annular portion 28A of the lower case 28 is set smaller than the amount of backlash that takes place between the first and second gears 24 and 25. Accordingly, if, due to inclination of the steering shaft 6, the first gear 24 is shifted radially outward toward the second gear 25, the annular body portion 24A of the first gear 24 is brought into contact with the first gear supporting annular portion 28A of the lower case 28 before occurrence of the backlash between the first and second gears 24 and 25, and thus, the radial outward movement of the first gear 24 toward the second gear 25 is restricted. Thus, the first gear 24 is prevented from being strongly pressed against the second gear 25 thereby to avoid breakage or damage of the teethes of these two gears 24 and 25.

In order to reduce the detection error, effective reduction of backlash between the first and second gears 24 and 25 may be thought out. That is, for such purpose, a coil spring or the like may be used for biasing the first gear 24 toward the second gear 25.

Figure 6:
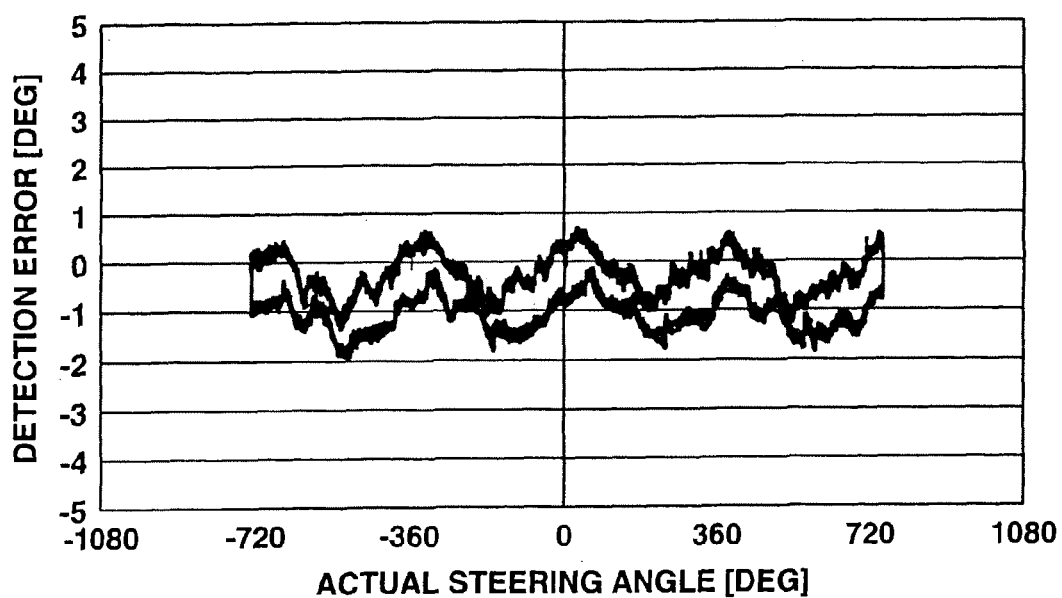
FIG. 6 is a graph showing a detection error of a steering angle sensor that would be produced when the first gear is biased toward a second gear.
Figure 7:
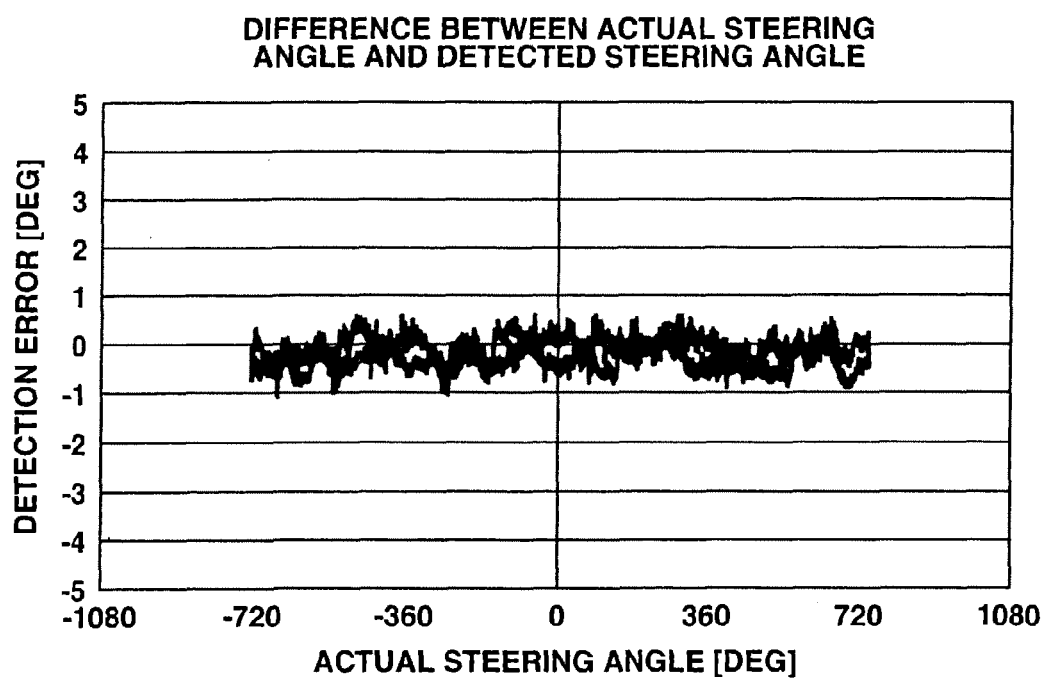
FIG. 7 is a graph showing a negligible detecting error of the steering angle sensor of the present invention.

In order to check and examine this idea, tests have been carried out and the results of the tests are depicted in the graphs of FIGS. 6 and 7. FIG. 6 shows the results of the test that reduced the backlash by using a coil spring, and FIG. 7 shows the results of the test that used the concept of the present invention. Each graph shows a difference (viz., detection error) between an actual steering angle and a detected steering angle (viz., absolute steering angle) at the time when, after being turned twice in one direction from a neutral angular position, the steering wheel was turned twice in the other direction to the neutral angular position.

As is seen from FIG. 6 that shows the results of the test is using the coil spring for reducing the backlash, in this case, a non-negligible detection error was produced, which may be caused by a direction transmission of inclination of the steering shaft 6 to the first gear 24.

While, as is seen from FIG. 7 that shows the results of the test using the concept of the present invention, in the present invention, the detection error was quite small as compared with that of the test results of FIG. 6, which may be caused by a sufficient absorbing of the inclination of the steering shaft 6 by the elastic O-ring 23.

The entire contents of Japanese Patent Application 2013-40326 filed Mar. 1, 2013 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A steering angle sensor comprising:
a steering shaft rotating together with a steering wheel;
a sensor housing arranged to enclose the steering shaft;
a first gear rotatably received in the sensor housing, the first gear including an annular body portion, disposed about a given part of the steering shaft leaving a given annular clearance therebetween, and an annular toothed portion formed on an outer periphery of the annular body portion;
a second gear rotatably received in the sensor housing, the second gear having a magnetic member at a center portion thereof and an annular toothed portion meshed with the annular toothed portion of the first gear;
a third gear rotatably received in the sensor housing, the third gear having another magnetic member at a center portion thereof and an annular toothed portion meshed with the annular toothed portion of the second gear, the second gear and the third gear being meshed to each other to form a speed reduction unit of the second and third gears that has a predetermined speed reduction rate;
a first magnetoresistive element detecting a change of a magnetic field produced by the magnetic member of the second gear for obtaining a first rotation angle of the second gear;
a second magnetoresistive element detecting a change of a magnetic field produced by the magnetic member of the third gear for obtaining a second rotation angle of the third gear;
an elastic member compressed in the given annular clearance between the steering shaft and the first gear, a thickness of the elastic member in a non-compressed condition being larger than a thickness of the given annular clearance; and
a control unit that obtains an absolute steering angle of the steering wheel based on the first and second rotation angles of the second and third gears.

2. A steering angle sensor as claimed in claim 1, in which the elastic member is made of either one of synthetic rubber and synthetic resin.

3. A steering angle sensor as claimed in claim 2, in which the elastic member is compressed between the steering shaft and the first gear in such a manner as to produce a frictional force when the steering shaft makes a rotation relative to the first gear thereby to transmit the rotation of the steering shaft to the first gear.

4. A steering angle sensor as claimed in claim 3, further comprising:
a projection provided in the steering shaft to rotate therewith; and
a recess provided in the first gear to rotate therewith, the recess being engageable with the projection,
wherein, upon engagement of the projection with the recess, the rotation of the steering shaft is directly transmitted to the first gear.

5. A steering angle sensor as claimed in claim 3, in which the elastic member transmits the rotation of the steering shaft to the first gear when the frictional force produced by the elastic member is greater than a frictional resistance produced between the first and second gears.

6. A steering angle sensor as claimed in claim 2, in which the sensor housing is formed with a first gear supporting portion that rotatably supports thereon the first gear, wherein a thickness of an annular clearance defined between the first gear supporting portion and the first gear is smaller than an amount of backlash provided between the first and second gears.

7. A steering angle sensor as claimed in claim 2, in which the elastic member is an O-ring that is concentrically disposed and compressed in the given annular clearance between the steering shaft and the first gear.

8. A steering angle sensor as claimed in claim 7, in which the elastic O-ring has a substantially circular cross section when in the non-compressed condition.

9. A steering angle sensor as claimed in claim 2, in which the steering shaft is formed with an annular groove at an outer cylindrical surface thereof, the annular groove being structured to receive the elastic member therein while the elastic member is compressed between the steering shaft and the first gear.

10. A steering angle sensor as claimed in claim 2, in which the elastic member is placed at a radial side of the steering shaft so as to reduce a relative displacement between the steering shaft and the first gear when the steering shaft is inclined relative to the first gear.

11. An electric power steering device comprising:
- a steering mechanism including a steering shaft that rotates together with a steering wheel and a rack bar that steers steered road wheels of an associated vehicle in response to rotation of the steering shaft;
- an electric motor by which a steering assist force is applied to the steering mechanism;
- a steering angle sensor that detects an absolute steering angle, the absolute steering angle being a rotation amount of the steering wheel from a neutral angular position of the steering wheel where the steered road wheels face in a straight advancing direction to a steered angular position of the steering wheel; and
- a control unit that controls the electric motor based on an output signal from the steering angle sensor,
- wherein the steering angle sensor comprises:
- a sensor housing arranged to enclose the steering shaft;
- a first gear rotatably received in the sensor housing, the first gear including an annular body portion, disposed about a given part of the steering shaft leaving a given annular clearance therebetween, and an annular toothed portion formed on an outer periphery of the annular body portion;
- a second gear rotatably received in the sensor housing, the second gear having a magnetic member at a center portion thereof and an annular toothed portion meshed with the annular toothed portion of the first gear;
- a third gear rotatably received in the sensor housing, the third gear having another magnetic member at a center portion thereof and an annular toothed portion meshed with the annular toothed portion of the second gear, the second gear and the third gear being meshed to each other to form a speed reduction unit of the second and third gears that has a predetermined speed reduction rate;
- a first magnetoresistive element detecting a change of a magnetic field produced by the magnetic member of the second gear for obtaining a first rotation angle of the second gear;
- a second magnetoresistive element detecting a change of a magnetic field produced by the magnetic member of the third gear for obtaining a second rotation angle of the third gear; and
- an elastic member compressed in the given annular clearance between the steering shaft and the first gear, a thickness of the elastic member in a non-compressed condition being larger than a thickness of the given annular clearance; and
- wherein the control unit obtains the absolute steering angle of the steering wheel based on the first and second rotation angles of the second and third gears.

12. An electric power steering device as claimed in claim 11, in which the elastic member is made of either one of synthetic rubber and synthetic resin.

13. An electric power steering device as claimed in claim 12, in which the elastic member is compressed between the steering shaft and the first gear in such a manner as to produce a frictional force when the steering shaft makes a rotation relative to the first gear thereby to transmit the rotation of the steering shaft to the first gear.

14. An electric power steering device as claimed in claim 13, further comprising:
- a projection provided in the steering shaft to rotate therewith; and
- a recess provided in the first gear to rotate therewith, the recess being engageable with the projection,
- wherein, upon engagement of the projection with the recess, the rotation of the steering shaft is directly transmitted to the first gear.

15. An electric power steering device as claimed in claim 13, in which the elastic member transmits the rotation of the steering shaft to the first gear when the frictional force produced by the elastic member is greater than a frictional resistance produced between the first and second gears.

16. An electric power steering device as claimed in claim 12, in which the sensor housing is formed with a first gear supporting portion that rotatably supports thereon the first gear, wherein a thickness of an annular clearance defined between the first gear supporting portion and the first gear is smaller than an amount of backlash provided between the first and second gears.

17. An electric power steering device as claimed in claim 12, in which the elastic member is an O-ring that is concentrically disposed and compressed in the given annular clearance between the steering shaft and the first gear.

18. An electric power steering device as claimed in claim 17, in which the elastic O-ring has a substantially circular cross section when in the non-compressed condition.

19. An electric power steering device as claimed in claim 12, in which the steering shaft is formed with an annular groove at an outer cylindrical surface thereof, the annular groove being structured to receive the elastic member therein while the elastic member is compressed between the steering shaft and the first gear.

20. An electric power steering device as claimed in claim 12, in which the elastic member is placed at a radial side of the steering shaft so as to reduce a relative radial displacement between the steering shaft and the first gear when the steering shaft is inclined relative to the first gear.

* * * * *